United States Patent
Wyrsta

(10) Patent No.: US 11,453,587 B2
(45) Date of Patent: Sep. 27, 2022

(54) COMPOSITIONS AND METHODS FOR PRODUCTION OF METAL PEROXIDES

(71) Applicant: LIXIVIA, INC., Santa Barbara, CA (US)

(72) Inventor: Michael D Wyrsta, Santa Barbara, CA (US)

(73) Assignee: Lixivia, Inc., Santa Barbara, CA (US)

(*) Notice: Subject to any disclaimer, the term of this patent is extended or adjusted under 35 U.S.C. 154(b) by 0 days.

(21) Appl. No.: 17/293,863

(22) PCT Filed: Nov. 19, 2019

(86) PCT No.: PCT/US2019/062242
§ 371 (c)(1),
(2) Date: May 13, 2021

(87) PCT Pub. No.: WO2020/106739
PCT Pub. Date: May 28, 2020

(65) Prior Publication Data
US 2022/0009778 A1    Jan. 13, 2022

Related U.S. Application Data

(60) Provisional application No. 62/769,435, filed on Nov. 19, 2018.

(51) Int. Cl.
*C01B 15/00* (2006.01)
*C01B 15/043* (2006.01)

(52) U.S. Cl.
CPC .................. *C01B 15/043* (2013.01)

(58) Field of Classification Search
CPC .................................... C01B 15/043
USPC ......................................... 423/583
See application file for complete search history.

(56) References Cited

U.S. PATENT DOCUMENTS

| | | | |
|---|---|---|---|
| 733,047 A * | 7/1903 | Jaubert | C01B 15/043 423/583 |
| 9,695,490 B2 * | 7/2017 | Komon | C22B 26/20 |
| 2009/0018013 A1 | 1/2009 | Hasegawa et al. | |
| 2014/0127096 A1 | 5/2014 | Komon et al. | |

FOREIGN PATENT DOCUMENTS

WO    2003078313    9/2003

OTHER PUBLICATIONS

Arghavan Rastinfard et al, "Controlled chemical synthesis of CaO2 particles coated with polyethylene glycol: characterization of crystallite size and oxygen release kinetics," RSC Advances, Dec. 19, 2017, vol. 8, No. 1, pp. 91-101.
PCT Search Report & PCT Written Opinion for PCT/US2019/062242 in the name of Lixivia, Inc. dated Mar. 9, 2020.

* cited by examiner

*Primary Examiner* — Steven J Bos
(74) *Attorney, Agent, or Firm* — Fish IP Law, LLP

(57) ABSTRACT

A method for generating metal peroxides from metal-containing raw materials is provided. The raw material is initially treated with a lixiviant salt, generating a soluble metal salt and a lixiviant base. Subsequent application of a peroxide or a source of peroxide generates the metal peroxide and also regenerates the lixiviant salt. This regenerated lixiviant salt can be recycled for application to additional raw material. Both stepwise and continuous processes are described.

22 Claims, 2 Drawing Sheets

COMPOSITIONS AND METHODS FOR PRODUCTION OF METAL PEROXIDES

This application claims the benefit of U.S. Provisional Patent Application No. 62/769,435 filed on Nov. 19, 2018. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is compositions and methods used in the production of metal peroxides, in particular calcium peroxide.

BACKGROUND

The following description includes information that may be useful in understanding the present invention. It is not an admission that any of the information provided herein is prior art or relevant to the presently claimed invention, or that any publication specifically or implicitly referenced is prior art.

Metal peroxides (i.e. peroxide salts of various metallic elements) find wide use in various oxidation reactions, for example bleaching of textiles and paper products and as environmentally friendly replacements for chlorine-based compounds in detergents and cleaning products. Calcium peroxide ($CaO_2$) is the peroxide salt of $Ca^{2+}$, and is used both as an oxidant for the recovery of precious metals from their ores and as a pre-sowing agent for use in agriculture. Calcium peroxide has also found use as an oxygenating and disinfecting agent in aquaculture (the salt is relatively insoluble in water, but hydrolyzes with the release of $O_2$) and has been used to aid in in situ bioremediation of petroleum contamination in soil and groundwater.

Typically, calcium peroxide is produced by combining calcium hydroxide with hydrogen peroxide. Other peroxides, such as sodium peroxide, can also be used (see U.S. Pat. No. 733,047, to Jaubert). All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. The calcium peroxide hydrate produced precipitates, and can be subsequently dried to prevent decomposition. Such processes, however, require the use of high purity starting materials in order to provide a pure calcium peroxide product. In addition, significant degradation of the hydrogen peroxide can occur, particularly in the presence of impurities such as iron.

International Patent Application Publication No. WO 2003/078313, to Aitta and Varila, describes treating caustic lime (CaO) with a stabilized hydrogen peroxide solution containing a water soluble silicate and a water soluble salt of a non-transition metal. The resulting product is a relatively impure mixture of calcium hydroxide and calcium peroxide. This serves to reduce loss of hydrogen peroxide to competing degradation reactions, however use of high purity calcium salts is still required in order to provide a pure calcium peroxide product.

Thus, there is still a need for compositions and methods that provide efficient production of high purity metal peroxide from relatively impure raw materials.

SUMMARY OF THE INVENTION

The inventive subject matter provides apparatus, systems and methods useful for producing peroxides of metals, such as alkaline earth metals (e.g. calcium), at high purity. The metal can be selectively extracted as a soluble salt from a crude raw material (such as steel slag, low quality lime, fly ash, ash from combustion of biomass, etc.) using a lixiviant in the form of a salt of a weak base. The soluble salt is, in turn, reacted with a peroxide (such as hydrogen peroxide) or a source of peroxide (such as a perborate) in the presence of a weak base in quantities sufficient to prevent precipitation of the corresponding alkaline earth hydroxide to form a relatively insoluble metal peroxide. This reaction also serves to regenerate the lixiviant species.

One embodiment of the inventive concept is a method for producing a metal peroxide by obtaining a raw material that includes an insoluble metal salt, contacting the raw material with a lixiviant salt (such as an amine compound and/or an HCl salt) to extract the metal from the raw material as a soluble metal salt, contacting the soluble metal salt with a peroxide (e.g. hydrogen peroxide) to generate an insoluble or solid metal peroxide while also regenerating the lixiviant salt, and separating the solid product from the solution phase. In some embodiments the method includes a step of drying the solid product. The regenerated lixiviant salt can be recycled to treat additional batches of raw material.

The method can include a step of contacting metal peroxide with water to generate a metal hydroxide; in such an embodiment essentially all (e.g. greater than 95%) of the metal peroxide is converted into the metal hydroxide to produce a highly purified metal hydroxide product. Suitable metals include Group I metals, Group 2 metals, an alkaline earth metal (such as calcium), and/or transition metals.

Another embodiment of the inventive concept is a method for producing a metal peroxide (such as a Group I metal, a Group 2 metal, alkaline earth metal, or a transition metal peroxide) by obtaining a raw material that includes a metal in the form of an insoluble metal salt, contacting the raw material with a lixiviant salt (such as an HCl salt of an amine compound) to extract the first metal from the raw material as a soluble metal and in the generating a suspension that includes an extracted solid and a solution that includes the soluble metal salt and a lixiviant base, and separating the extracted solid from the solution. The extracted solid can be treated to recover a second metal or a peroxide of the second metal. The solution is subsequently contacted with a peroxide (such as hydrogen peroxide) or a source of peroxide to generate a second suspension that includes a metal peroxide and a second solution that includes a regenerated lixiviant salt. In some embodiments a supplementary base is added to the solution. This supplementary base (which can be lixiviant base) is selected to not result in precipitation of a hydroxide of the metal. The metal peroxide is separated from the regenerated lixiviant salt and can be subsequently dried. In some embodiments the regenerated lixiviant salt is recycled for use in processing additional raw material. In some embodiments the method includes an additional step of contacting the metal peroxide with water in order to convert at least a portion of the metal peroxide into a metal hydroxide. In such embodiments essentially all of the metal peroxide can be converted into the metal hydroxide to produce a highly purified metal hydroxide product.

Another embodiment of the inventive concept is a method for producing a metal peroxide (such as a Group I metal, a Group 2 metal, alkaline earth metal, or a transition metal peroxide) by obtaining a raw material that includes a metal in the form of an insoluble metal salt, contacting the raw material with a lixiviant salt (such as an HCl salt of an amine compound) to extract the first metal from the raw material as a soluble metal and generating a suspension that includes an extracted solid and a solution that includes the soluble metal salt and a lixiviant base. This suspension is subsequently contacted with a peroxide (such as hydrogen peroxide) or a source of peroxide to generate a second suspension that includes a metal peroxide, the extracted solid, and a second solution that includes a regenerated lixiviant salt. In some embodiments a supplementary base is added to the solution. This supplementary base (which can be lixiviant base) is selected to not result in precipitation of a hydroxide of the metal. The metal peroxide, the extracted solid, and the regenerated lixiviant salt are separated from one another (for example, using a centrifuge) and the metal peroxide can be subsequently dried. In some embodiments the regenerated lixiviant salt is recycled for use in processing additional raw material. The method can be implemented as a continuous process. In some embodiments the method includes an additional step of contacting the metal peroxide with water in order to convert at least a portion of the metal peroxide into a metal hydroxide. In such embodiments essentially all of the metal peroxide can be converted into the metal hydroxide to produce a highly purified metal hydroxide product.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
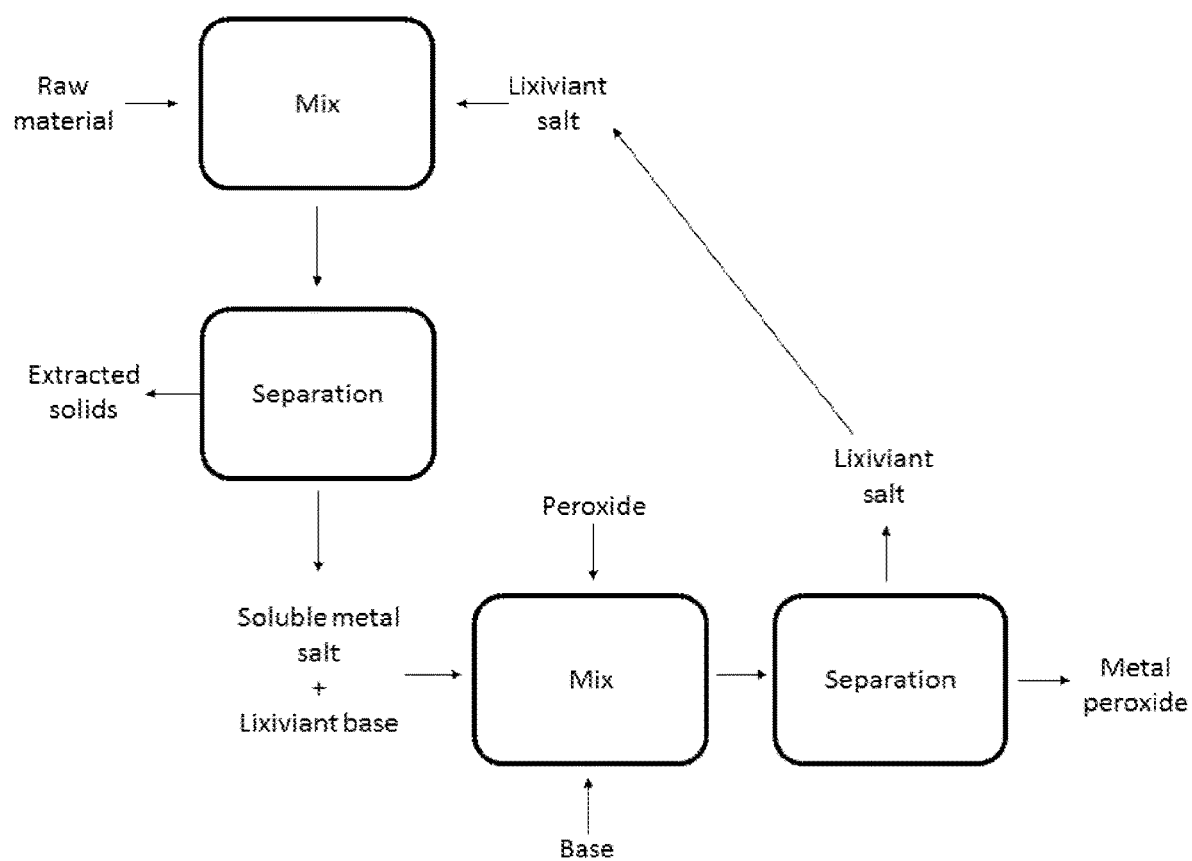
FIG. 1 schematically depicts a stepwise embodiment of a process of the inventive concept.

The inventive subject matter provides compositions and methods for preparation of metal peroxides, such as calcium peroxide. Although exemplary embodiments described below are directed to production of calcium peroxide, the Inventors envision application of methods of the inventive concept to production of other metal peroxides (e.g. peroxide salts of alkali metals, alkaline earth metals, and/or transition metals). These can be produced from relatively high purity or, advantageously, from relatively crude starting materials using suitable lixiviant species. In methods of the inventive concept calcium peroxide can be produced by contacting a metal salt solution with a peroxide (e.g. hydrogen peroxide, sodium peroxide, etc.) in the presence of a base strong enough to drive the reaction but not so strong as to result in precipitation of the metal hydroxide. In a preferred embodiment a calcium salt solution can be prepared by selective extraction from a low purity calcium source (e.g. steel slag, low grade lime, ash, etc.), in a reaction that coproduces a base utilized to drive the subsequent reaction of the calcium salt with peroxide to produce calcium peroxide. Such an embodiment can utilize a lixiviant species that is regenerated on reaction of the calcium salt with peroxide, permitting the lixiviant species to be recycled for use in additional calcium extraction.

The Inventor has found that in using a metal salt solution derived from a crude source (e.g. as provided from a crude calcium source through the use of a suitable lixiviant) in conjunction with a weak base, the reaction with peroxide proceeds rapidly and cleanly. Solid calcium peroxide generated by such a process is of high purity and can quickly be isolated from solution and dried to preserve its potency. Furthermore, the byproduct of this reaction with the weak base present can allow for the working solution to be recycled to generate additional solutions of purified calcium salt, providing a closed production loop.

One should appreciate that the methods and compositions of the inventive concept permit the generation of useful metal peroxides at high purity from crude raw materials, and the recycling of the lixiviant used in the process advantageously allows this to take place with minimal environmental impact.

It should also be appreciated that compositions and methods of the inventive concept can provide a process for generating high purity calcium hydroxide or lime from an impure calcium source, for example by further reacting calcium peroxide (generated as described above) with water, or by simple heating. This saves considerable amounts of energy compared to a typical process of generating high purity calcium carbonate and decomposing the carbonate salt using high temperatures.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

Extraction of metals such as calcium from slag and other metal-containing materials to make a metal salt solution through the use of a lixiviant has been previously discussed in other works by the Inventors (for example, U.S. Pat. No. 9,695,490, which is hereby incorporated by reference). Although the examples provided below are directed to the generation of calcium peroxide, the Inventors envision that similar processes can be applied for the production of other metal peroxides.

Suitable lixiviants include amine-containing salts. Amine-containing lixiviants of the inventive concept include one or more amines with the general formula shown in Compound 1, where N is nitrogen, H is hydrogen, and X is a counterion (i.e., a counter anion).

$$Ny, R_1, R_2, R_3, H-Xz \qquad \text{Compound 1}$$

Suitable counterions can be any form or combination of atoms or molecules that produce the effect of a negative charge. Counterions can be halides (for example fluoride, chloride, bromide, and iodide), anions derived from mineral acids (for example nitrate, phosphate, bisulfate, sulfate, silicates), anions derived from organic acids (for example carboxylate, citrate, malate, acetate, thioacetate, propionate and, lactate), organic molecules or biomolecules (for example acidic proteins or peptides, amino acids, nucleic acids, and fatty acids), and others (for example zwitterions and basic synthetic polymers). For example, monoethanolamine hydrochloride (MEA·HCl, $HOC_2H_4NH_3Cl$) conforms to Compound 1 as follows: one nitrogen atom (N1) is bound to one carbon atom (R1=$C_2H_5O$) and 3 hydrogen atoms (R2, R3 and H), and there is one chloride counteranion (X1=Cl—). In another example, ammonium chloride ($NH_4Cl$) conforms to Compound 1 as follows: one nitrogen atom (N1) is bound to 4 hydrogen atoms (R1, R2, R3, and H) and there is one chloride counterion (X1=Cl—). Amine-containing salts suitable for the extraction of a variety of valuable metals (e.g. calcium) from waste materials such as steel slag, mine tailings, fly ash, etc. Such amine-containing lixiviants can have a pKa of about 7 or about 8 to about 14, and can include protonated ammonium salts (i.e., not quaternary).

Examples of suitable amine-containing salts for use in lixiviants include salts of weak bases such as ammonia, nitrogen-containing organic compounds (for example monoethanolamine, diethanolamine, triethanolamine, morpholine, ethylene diamine, diethylenetriamine, triethylenetetramine, methylamine, ethylamine, propylamine, dipropylamines, butylamines, diaminopropane, triethylamine, dimethylamine, and trimethylamine), low molecular weight biological molecules (for example glucosamine, amino sugars, tetraethylenepentamine, amino acids, polyethyleneimine, spermidine, spermine, putrescine, cadaverine, hexamethylenediamine, tetraethylmethylenediamine, polyethyleneamine, cathine, isopropylamine, and a cationic lipid), biomolecule polymers (for example chitosan, polylysine, polyornithine, polyarginine, a cationic protein or peptide), and others (for example a dendritic polyamine, a polycationic polymeric or oligomeric material, and a cationic lipid-like material), or combinations of these. Compounds having the general formula shown in Compound 1 can have a wide range of acidities, and an amine-containing salt of the inventive concept can be selected on the basis of its acidity so that it can selectively react with the insoluble salt of the metal of interest.

As noted above, a high purity metal salt solution can be obtained from crude source materials (steel slag, low quality lime, fly ash, ash from combustion of biomass, etc.) by extraction with a suitable lixiviant species. Suitable lixiviant species include protonated amine salts (such as monoethanolamine hydrochloride or MEAHCl), but are not limited to this class of compounds. For simplicity, the lixiviant species in the following examples is assumed to be a hydrochloride salt, abbreviated as HLixCl. Other salts are suitable. A vessel that holds a starting mixture of lixiviant and a metal source (e.g. a steel slag) will be referred to as an extractor. The mixture within the extractor does not need to be agitated but providing ample agitation to suspend solids can improve the reaction kinetics for calcium extraction. The exemplary reactions shown below depict generation of calcium peroxide, however other metal peroxides can be generated in a similar manner (with appropriate adjustments for stoichiometry), Immediately upon contact between a crude raw material that provides a source of calcium (e.g. $CaO/Ca(OH)_2$ present in waste materials such as steel slag) and the lixiviant solution, selective extraction of calcium (Equation 1) will proceed until either the lixiviant (HLixCl) is consumed (e.g. in the case of excess extractable calcium), leaving a spent lixiviant (Lix) and calcium chloride in the solution phase or until the extractable calcium is depleted in which case the solution will contain calcium chloride, spent lixiviant (Lix), and some unreacted lixiviant (HLixCl). In some embodiments additional spent lixiviant can be provided to enhance or induce precipitation of $CaO_2$ when peroxide is added in the later steps.

For simplicity, it is assumed that the extractable calcium within the crude raw material is in the form of slaked lime ($Ca(OH)_2$) due to contact with water, however similar selective reactions could be envisioned for unslaked lime (CaO) or calcium containing mineral phases such as calcium silicate ($CaSiO_3$), amongst others. Furthermore, some reaction of lixiviant with calcium hydroxide can occur in the aqueous phase as there is some solubility of $Ca(OH)_2$, or it may occur between the aqueous phase lixiviant and solid calcium containing material. The mechanism by which the reaction occurs is irrelevant. Only that selective extraction of calcium occurs is important. That being said, a typical reaction is shown below in Equation 1.

$$Ca(OH)_2 + 2HLixCl \rightarrow CaCl_2 + 2H_2O + 2Lix$$

Equation 1: Reaction of Lixiviant with Extractable
Calcium in a Steel Slag

The calcium containing solution is then separated from the slag, for example by filtration, centrifugation, settling, decanting or other appropriate means. Calcium peroxide can then be precipitated by addition of a peroxide or peroxide generating compound or solution (for example, hydrogen peroxide, sodium peroxide, a perborate, etc.) to the solution containing the calcium salt and spent lixiviant, as shown in Equation 2. It should be appreciated that this reaction also regenerates the lixiviant from the spent lixiviant.

$$CaCl_2 + H_2O_2 + 2Lix \rightarrow CaO_2 + 2HLixCl$$

Equation 2: Reaction of Calcium Salt with
Hydrogen Peroxide, with Regeneration of Lixiviant As noted above, calcium peroxide is essentially insoluble in water and as such precipitates from solution. Separation of solid $CaO_2$ from the aqueous phase (for example, by filtration, settling, decanting, centrifugation, etc.) should be performed rapidly as the calcium peroxide product is unstable when exposed to water. The decomposition reaction is given in Equation 3, showing generation of calcium hydroxide and oxygen gas. It is possible that the decomposition goes through an intermediate step of producing hydrogen peroxide (Equation 4), which subsequently decomposes into water and oxygen gas (Equation 5).

$$CaO_2 + H_2O \rightarrow Ca(OH)_2 + \tfrac{1}{2}O_2$$

Equation 3: Decomposition of Calcium Peroxide on
Contact with Water $$CaO_2 + 2H_2O \rightarrow Ca(OH)_2 + H_2O_2$$

Equation 4: Alternate Calcium Peroxide
Decomposition Route, Step 1

$$H_2O_2 \rightarrow H_2O + \tfrac{1}{2}O_2$$

Equation 5: Alternate Calcium Peroxide
Decomposition Route, Step 2

The mechanism of calcium peroxide decomposition is less important than the conditions during which it occurs. If such decomposition occurs in the presence of regenerated lixiviant, the calcium hydroxide initially produced will be re-dissolved via the reaction in Equation 1, resulting in a net decomposition of hydrogen peroxide. However, if the calcium peroxide is isolated (e.g. by filtration and washing) before significant decomposition occurs, continued contact with water free of spent lixiviant can yield highly pure (e.g. >90%) calcium hydroxide ($Ca(OH)_2$) as the final product. If implemented in this fashion, the overall method provides a highly pure calcium hydroxide produced through the selective extraction of calcium from calcium-containing minerals or waste products, such as steel slag.

Alternatively, after isolating and washing precipitated $CaO_2$ the solid can be dried to yield a reasonably shelf-stable dry calcium peroxide. Under cool, dry conditions, $CaO_2$ loses only about 1% of active oxygen per year.

The calcium peroxide produced in this manner can also be thermally decomposed to generate lime (CaO), as shown in Equation 6. This method provides an advantageous way to make high purity lime (CaO), particularly from low quality limestone or low quality lime sources.

$$CaO_2 \rightarrow CaO + \tfrac{1}{2}O_2$$

Equation 6: Thermal Decomposition of Calcium
Peroxide

Methods of the inventive concept can be performed in a discontinuous or stepwise manner, or can be performed in a continuous manner. FIG. 1 provides a schematic illustration of a discontinuous or stepwise method of the inventive concept. Initially, a raw material that includes a metal of interest (e.g. calcium) in insoluble form (e.g. an oxide, hydroxide, etc.) is mixed with a lixiviant salt (such as an HCl salt). The lixiviant salt is selected to selectively extract the metal of interest from the raw material in the form of a soluble salt, generating lixiviant base and extracted solids in the process. Extracted solids are separated from this mixture (for example, by filtering, settling, decanting, and/or centrifugation), and the liquid phase that includes the metal of interest in the form of a soluble salt and the lixiviant base collected. This liquid phase is then treated with a peroxide (such as hydrogen peroxide, sodium peroxide, etc.) or a source of peroxide (e.g. a perborate), and optionally can be treated by the addition of a base selected to not support precipitation of the metal hydroxide. In order to reduce the rate of metal peroxide decomposition and/or hydrolysis, temperature can be controlled on or following addition of peroxide or a source of peroxide. For example, temperature can be controlled at between ambient temperature and about 30° C., 40° C., 50° C., and 60° C. In some embodiments the base can be additional lixiviant base. Reaction with the peroxide generates a metal peroxide that is either insoluble or has very limited solubility (e.g. less than 100 g/L), and also regenerates the lixiviant salt. A second separation step serves to recover the metal peroxide. In some embodiments the regenerated lixiviant salt can be returned to a second cycle of the process and used for treatment of additional raw material. This advantageously reduces the amount of lixiviant used and reduces the process waste stream. In some embodiments the extracted solids from the process can be treated to recover additional metals and/or generate additional metal peroxides. In other embodiments the extracted solids from the process can be utilized as fillers in building materials (e.g. concrete) and/or polymer products, where extraction of potentially reactive metals can advantageously provide a greater degree of resistance to environmental conditions than the initial raw material.

Figure 2:
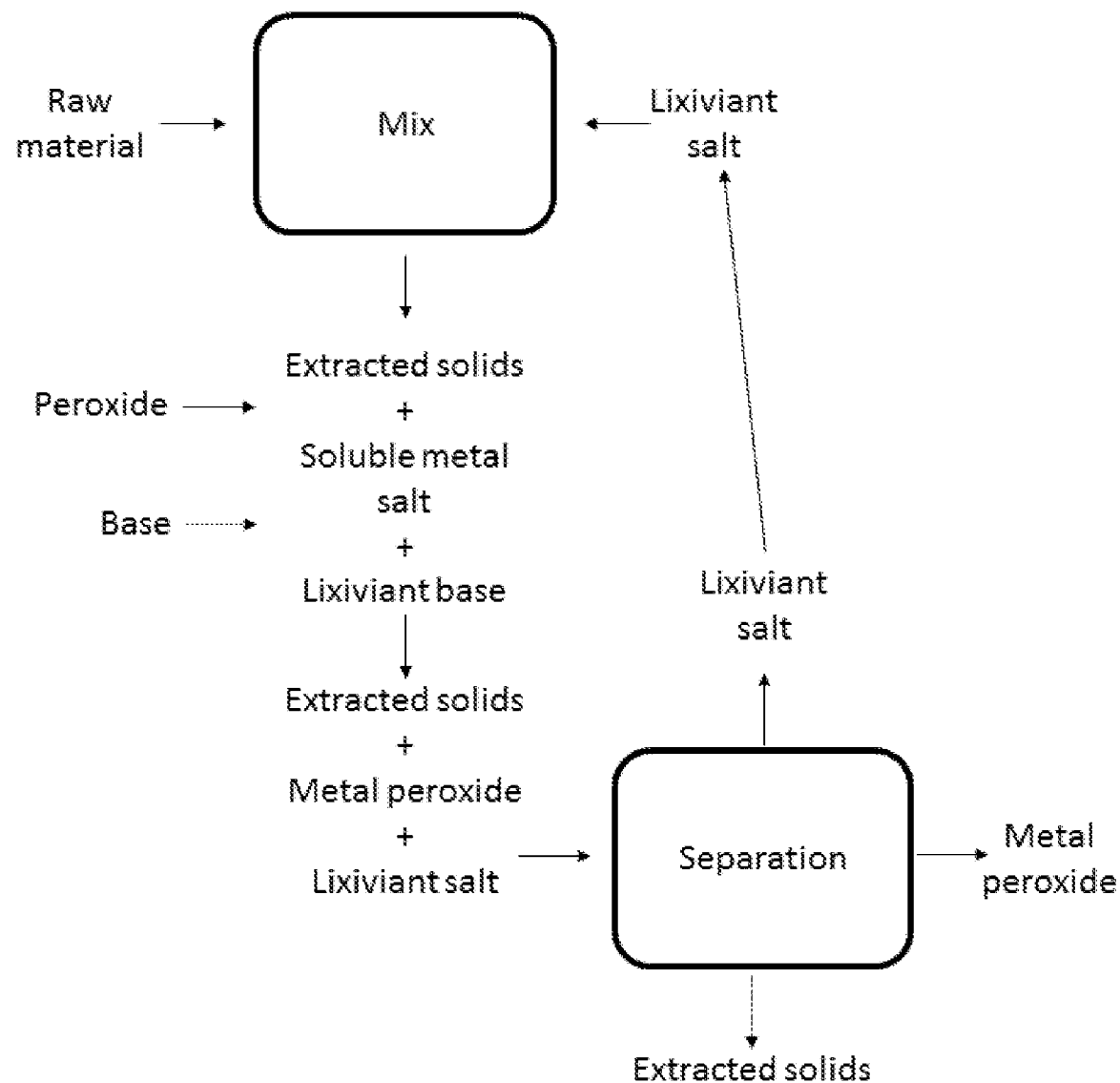
FIG. 2 schematically depicts a continuous embodiment of a process of the inventive concept.

FIG. 2 depicts an alternative method of the inventive concept, which can be performed continuously. Initially, a raw material that includes a metal of interest (e.g. calcium) in insoluble form (e.g. an oxide, hydroxide, etc.) is mixed with a lixiviant salt (such as an HCl salt). The lixiviant salt is selected to selectively extract the metal of interest from the raw material in the form of a soluble salt, generating lixiviant base and extracted solids in the process. The resulting suspension includes extracted solids, a soluble metal salt, and lixiviant base. A peroxide (e.g. hydrogen peroxide, sodium peroxide, etc.) or a source of peroxide (such as a perborate) is added to this suspension; optionally a base can also be added. Such a base is selected to not result in the precipitation of hydroxides of the metal, and can be in the form of additional lixiviant base. Addition of the peroxide results in the generation of a suspension of an insoluble or relatively insoluble metal peroxide, extracted solids, and regenerated lixiviant salt. This suspension is separated using a process that discriminates between particles of extracted solids and particles of precipitated metal peroxide, and that can at least partially separate these from each other and from the liquid phase of the suspension. Such a separation method can rely on differences in density between the particulates of the suspension. Suitable separation methods include settling and centrifugation. Centrifugation can be performed in a continuous manner (for example, using a cyclone separator). In order to reduce the rate of metal peroxide decomposition and/or hydrolysis, temperature can be controlled on or following addition of peroxide or a source of peroxide. For example, temperature can be controlled at between ambient temperature and about 30° C., 40° C., 50° C., and 60° C. When a continuous separation method is used a stream of raw material can be used to generate a stream of suspended reaction products that are separated to continuously generate three product streams: a metal peroxide stream, an extracted solids stream, and a regenerated lixiviant stream. The metal peroxide stream can be collected, rinsed, and optionally dried (e.g. for storage stability). The regenerated lixiviant stream can be returned to the initial mixing stage for extraction of additional raw material. The extracted raw material stream can be discarded or treated to recover additional metals and/or generate additional metal peroxides. In other embodiments the extracted solids from the process can be utilized as fillers in building materials (e.g. concrete) and/or polymer products, where extraction of potentially reactive metals can advantageously provide a greater degree of resistance to environmental conditions than the initial raw material.

EXAMPLE 1

Monoethanolamine hydrochloride (MEAHCl) (6.15 g) was dissolved in water (100 g) and stirred at 500 rpm. Steel slag (10.04 g, average diameter <125 μm) was added and the slurry stirred for about 90 minutes. The solids were separated from solution using filter paper in a Buchner funnel, washing twice with about 20 mL water. The solids were dried in a 105° C. convection oven to a final mass of 8.057 g.

The pH of the resulting extraction solution was measured, using indicating strips, to be about 11. Hydrogen peroxide (3%, 36 g) was added to the extraction solution with no immediate effect. Approximately 6 g of monoethanolamine (MEA) was then added, which resulted in precipitation of a white to off-white solid. This solid was isolated by filtration as rapidly as possible to minimize decomposition of the calcium peroxide product (evident by evolution of gas bubbles). After washing the solids twice with about 10 ml water, they were dried in a 105° C. oven overnight to a final mass of 1.3015 g. The resulting product was a light tan powder, which was shown to be 70.6% $CaO_2$ by permanganate titration.

A sample of the tan powder product (0.6763 g) was added to a combustion boat and placed in a furnace at 400° C. for 2 hours. The final product was a bright white powder weighing 0.6461 g, which was shown to be <0.3% $CaO_2$ by permanganate titration (at the detection limit of the test).

EXAMPLE 2

MEAHCl (6.14 g) was dissolved in water (80 g) and stirred at 500 rpm. Steel slag (10.01 g, mean diameter <125 μm) was added and the slurry stirred for about 60 minutes. The solids were separated from solution using filter paper in a Buchner funnel, washing twice with about 20 mL water. The solids were dried in a 105° C. convection oven to a final mass of 7.987 g.

Hydrogen peroxide (30%, 3.56 g) was added to the extraction solution, which darkened in color slightly to a light yellow. Approximately 0.5 g of MEA was added which resulted in precipitation of a white to off-white solid. This solid was isolated by filtration as rapidly as possible to minimize decomposition of the calcium peroxide product (evident by evolution of gas bubbles). After washing the solids twice with about 10 ml water, they were dried in a 105° C. oven overnight to a final mass of 1.028 g. The resulting product was a tan powder, which was shown to be 77.5% $CaO_2$ by permanganate titration.

A sample of the tan powder product (0.6030 g) was added to a combustion boat and placed in a furnace at 400° C. overnight. The final product was a bright white powder weighing 0.5990 g, which was shown to be <0.1% $CaO_2$ by permanganate titration (the detection limit of the test).

EXAMPLE 3

MEAHCl (6.09 g) was dissolved in water (80 g) and stirred at 500 rpm. Steel slag (9.99 g, mean diameter <125 μm) was added and the slurry stirred for about 60 minutes. The solids were separated from solution using filter paper in a Buchner funnel, washing twice with about 20 mL water. The solids were dried in a 105° C. convection oven to a final mass of 8.0655 g.

Hydrogen peroxide (30%, 3.58 g) was added to the extraction solution, which darkened in color slightly to a light yellow. Within about 10 seconds, precipitation of a white to off-white solid occurred. This solid was isolated by filtration as rapidly as possible to minimize decomposition of the calcium peroxide product (evident by evolution of gas bubbles). After washing the solids twice with about 10 ml water, they were dried in a 105° C. oven for several hours to a final mass of 1.087 g. The resulting product was a tan powder, which was shown to be 74.0% $CaO_2$ by permanganate titration.

EXAMPLE 4

MEAHCl (6.14 g) was dissolved in water (93 g) and stirred at 500 rpm. 0.95 g of MEA was added, followed by 10.04 g of steel slag (mean diameter <125 μm) and the slurry stirred for about 30 minutes. The solids were separated from solution using filter paper in a Buchner funnel, washing twice with about 10 mL water. The solids were dried in a 105° C. convection oven to a final mass of 7.905 g.

Hydrogen peroxide (30%, 3.85 g) was added to the extraction solution, which darkened in color slightly to a light yellow. Approximately 0.5 g more MEA was added which resulted in precipitation of a white to off-white solid. This solid was isolated by filtration as rapidly as possible to minimize decomposition of the calcium peroxide product (evident by evolution of gas bubbles). After washing the solids twice with about 5 ml water, they were dried in a 105° C. oven for several hours to a final mass of 1.234 g. The resulting product was a tan powder, which was shown to be 78.9% $CaO_2$ by permanganate titration.

EXAMPLE 5

MEAHCl (6.09 g) was dissolved in water (92 g) and stirred at 500 rpm. 1.88 g of MEA was added, followed by 10.20 g of steel slag (mean diameter <125 μm) and the slurry stirred for about 30 minutes. The solids were separated from solution using filter paper in a Buchner funnel, washing twice with about 10 mL water. The solids were dried in a 105° C. convection oven to a final mass of 8.162 g.

Hydrogen peroxide (30%, 3.68 g) was added to the extraction solution, which darkened in color slightly to a light yellow. Within about 10 seconds, precipitation of a white to off-white solid occurred. This solid was isolated by filtration as rapidly as possible to minimize decomposition of the calcium peroxide product (evident by evolution of gas bubbles). After washing the solids twice with about 5 ml water, they were dried in a 105° C. oven for several hours to a final mass of 1.031 g. The resulting product was a tan powder, which was shown to be 79.5% $CaO_2$ by permanganate titration.

EXAMPLE 6

MEAHCl (6.09 g) was dissolved in water (91 g) and stirred at 500 rpm. 2.82 g of MEA was added, followed by 10.13 g of steel slag (mean diameter <125 µm) and the slurry stirred for about 30 minutes. The solids were separated from solution using filter paper in a Buchner funnel, washing twice with about 10 mL water. The solids were dried in a 105° C. convection oven to a final mass of 8.138 g.

Hydrogen peroxide (30%, 3.69 g) was added to the extraction solution, which darkened in color slightly to a light yellow. Within about 10 seconds, precipitation of a white to off-white solid occurred. This solid was isolated by filtration as rapidly as possible to minimize decomposition of the calcium peroxide product (evident by evolution of gas bubbles). After washing the solids twice with about 5 ml water, they were dried in a 105° C. oven for several hours to a final mass of 1.101 g. The resulting product was a tan powder, which was shown to be 71.2% $CaO_2$ by permanganate titration.

EXAMPLE 7

MEAHCl (6.06 g) was dissolved in water (90 g) and stirred at 500 rpm. 3.75 g of MEA was added, followed by 10.08 g of steel slag (mean diameter <125 µm) and the slurry stirred for about 30 minutes. The solids were separated from solution using filter paper in a Buchner funnel, washing twice with about 10 mL water. The solids were dried in a 105° C. convection oven to a final mass of 8.107 g.

Hydrogen peroxide (30%, 3.64 g) was added to the extraction solution, which darkened in color slightly to a light yellow. Almost immediately, precipitation of a white to off-white solid occurred. This solid was isolated by filtration as rapidly as possible to minimize decomposition of the calcium peroxide product (evident by evolution of gas bubbles). After washing the solids twice with about 5 ml water, they were dried in a 105° C. oven for several hours to a final mass of 1.355 g. The resulting product was a tan powder, which was shown to be 67.7% $CaO_2$ by permanganate titration.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. A method for producing a metal peroxide, comprising:
   obtaining a first portion of a raw material comprising an insoluble metal salt;
   contacting the raw material with a lixiviant salt to extract a metal from the raw material as a first solution comprising a soluble metal salt comprising the metal;
   contacting the first solution with a peroxide or a source of peroxide to generate a suspension comprising a solid product comprising a metal peroxide comprising the metal and to generate a second solution comprising a regenerated lixiviant salt; and
   separating the solid product from the second solution.

2. The method of claim 1, further comprising the step of contacting the solid product with water, thereby converting at least a portion of the metal peroxide into a metal hydroxide to produce a highly purified metal hydroxide product.

3. The method of claim 1, wherein the lixiviant salt comprises an amine compound.

4. The method of claim 1, wherein the metal peroxide comprises a Group I metal, a Group 2 metal, or a transition metal.

5. The method of claim 1, further comprising the step of recycling at least a portion of the second solution to contact a second portion of the raw material.

6. A method for producing a metal peroxide, comprising:
   obtaining a first portion of a raw material comprising a first metal in the form of an insoluble metal salt;
   contacting the raw material with a lixiviant salt to extract the first metal from the raw material as a soluble metal salt, thereby generating a first suspension comprising an extracted solid and a first solution comprising the soluble metal salt and a lixiviant base;
   separating the extracted solid from the first solution;
   contacting the first solution with a peroxide or a source of peroxide to generate a second suspension comprising a metal peroxide and to generate a second solution comprising a regenerated lixiviant salt; and
   separating the metal peroxide from the regenerated lixiviant salt.

7. The method of claim 6, further comprising the step of contacting the metal peroxide with water, thereby converting at least a portion of the metal peroxide into a metal hydroxide to produce a highly purified metal hydroxide product.

8. The method of claim 6, wherein the lixiviant salt comprises an amine compound.

9. The method of claim 6, wherein the metal peroxide comprises a Group I metal, a Group 2 metal, or a transition metal.

10. The method of one of claim 6, further comprising the step of recycling at least a portion of the regenerated lixiviant salt to contact a second portion of the raw material.

11. The method of claim 6, wherein the extracted solid is treated to recover a second metal or a peroxide of the second metal.

12. The method of claim 6, comprising the step of adding a supplementary base to the first solution, wherein the supplementary base is selected to not result in precipitation of a hydroxide of the first metal.

13. The method of claim 12, wherein the supplementary base comprises a lixiviant base.

14. A method for producing a metal peroxide, comprising:
obtaining a first portion of a raw material comprising a first metal in the form of an insoluble metal salt;
contacting the raw material with a lixiviant salt to extract the first metal from the raw material as a soluble metal salt, thereby generating a first suspension comprising an extracted solid and a first solution comprising the soluble metal salt and a lixiviant base;
contacting the first suspension with a peroxide or a source of peroxide to generate a second suspension comprising a metal peroxide, an extracted solid, and a second solution comprising a regenerated lixiviant salt; and
separating the second suspension to generate a first product stream comprising the metal peroxide, a second product stream comprising the extracted solid, and a third product stream comprising the regenerated lixiviant salt.

15. The method of claim 14, further comprising the step of contacting the metal peroxide with water, thereby converting at least a portion of the metal peroxide into a metal hydroxide to produce a highly purified metal hydroxide product.

16. The method of claim 14, wherein the lixiviant salt comprises an amine compound.

17. The method of claim 14, wherein the metal peroxide comprises a Group I metal, a Group 2 metal, or a transition metal.

18. The method of claim 14, further comprising the step of recycling at least a portion of the regenerated lixiviant salt to contact a second portion of the raw material.

19. The method of claim 14, wherein the extracted solid is treated to recover an additional metal or metal peroxide.

20. The method of claim 14, comprising the step of adding a supplementary base to the first suspension, wherein the supplementary base is selected to not result in precipitation of a hydroxide of the first metal.

21. The method of claim 20, wherein the supplementary base comprises the lixiviant base.

22. The method of claim 14, wherein the method is performed in a continuous manner.

* * * * *